United States Patent [19]

Kern

[11] 4,275,402

[45] Jun. 23, 1981

[54] CIRCUIT ARRANGEMENT FOR TEMPERATURE-DEPENDENT VOLTAGE REGULATION OF PIEZO-ELECTRIC RECORDING NOZZLES IN INK MOSAIC RECORDING DEVICES

[75] Inventor: Hans Kern, Munich, Fed. Rep. of Germany

[73] Assignee: Siemens Aktiengesellschaft, Berlin & Munich, Fed. Rep. of Germany

[21] Appl. No.: 106,841

[22] Filed: Dec. 26, 1979

[30] Foreign Application Priority Data

Jan. 29, 1979 [DE] Fed. Rep. of Germany ....... 2903339

[51] Int. Cl.[3] .............................................. G01D 15/18

[52] U.S. Cl. .................................... 346/140 R; 346/75

[58] Field of Search ........................... 346/75, 140 PD

[56] References Cited

U.S. PATENT DOCUMENTS

| | | | |
|---|---|---|---|
| 3,914,772 | 10/1975 | Kashio | 346/75 |
| 3,971,039 | 7/1976 | Takano et al. | 346/75 |
| 4,007,684 | 2/1977 | Takano et al. | 346/75 X |
| 4,161,670 | 7/1979 | Kern | 346/140 R X |

*Primary Examiner*—George H. Miller, Jr.

*Attorney, Agent, or Firm*—Hill, Van Santen, Steadman, Chiara & Simpson

[57] ABSTRACT

A circuit arrangement for piezo-electric recording nozzles, in ink mosaic recording devices, to effect a temperature regulation of the control voltages therefor in which the respective recording nozzles are each provided with a control circuit for individually controlling the respective nozzles and which may be individually adjusted, in combination with a regulating circuit which is common to all of the control circuits, and includes temperature-dependent means for controlling the regulating means, whereby the latter supplies at its output a voltage which varies in accordance with the environmental temperature at such temperature-dependent means.

7 Claims, 1 Drawing Figure

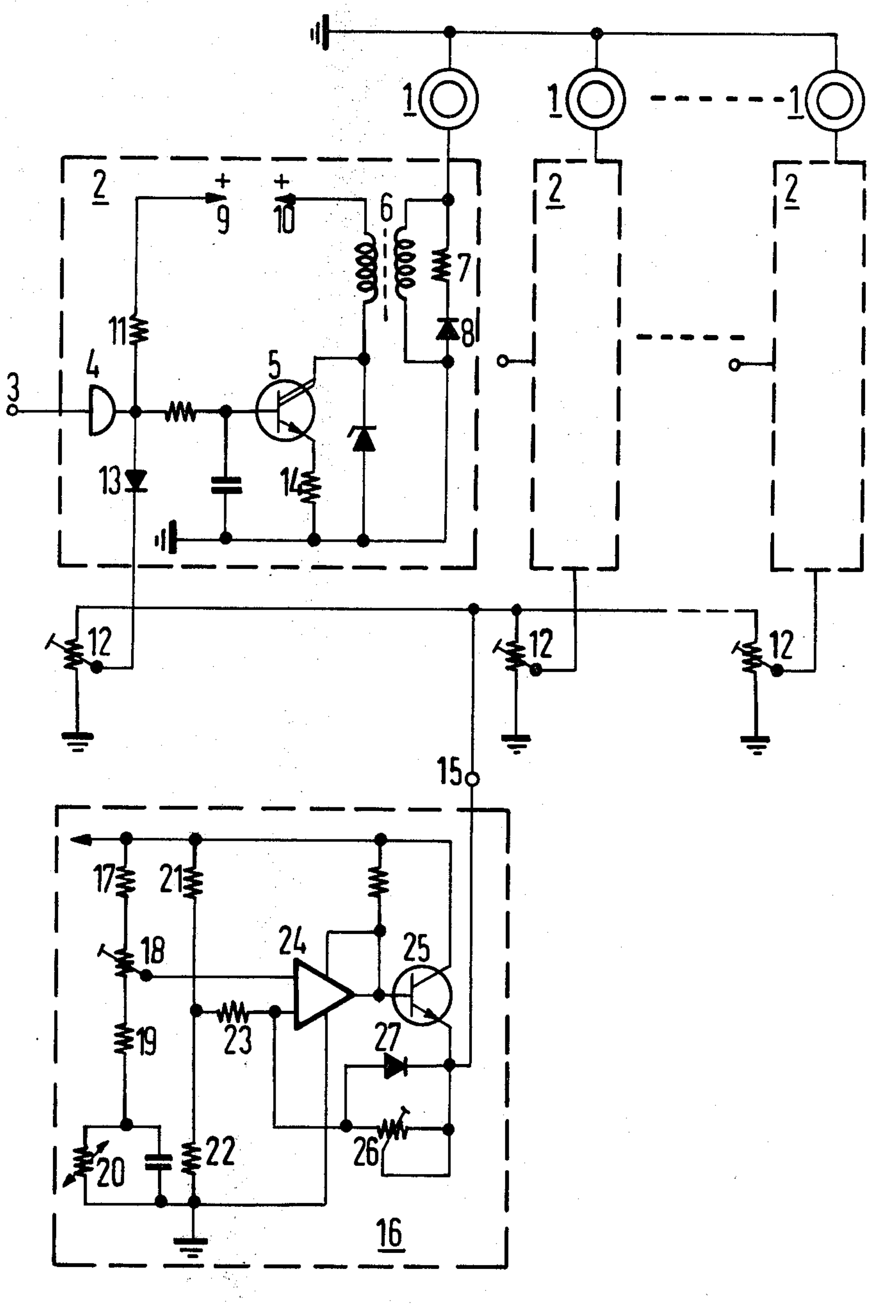
1
1
1
2
2
2
+
9
+
10
6
7
8
11
3
4
5
13
14
12
12
12
15
17
21
18
24
25
19
23
27
20
22
26
16

CIRCUIT ARRANGEMENT FOR TEMPERATURE-DEPENDENT VOLTAGE REGULATION OF PIEZO-ELECTRIC RECORDING NOZZLES IN INK MOSAIC RECORDING DEVICES

BACKGROUND OF THE INVENTION

The invention relates to a circuit arrangement for temperature-dependent voltage regulation of control voltages required in the operation of piezo-electric recording nozzles of ink mosaic recording devices.

Circuit arrangements of this type may comprise a control circuit which is assigned to each recording nozzle and contains a voltage transformer circuit whose secondary inductance, together with the capacitance of the recording nozzle, form an oscillating circuit, and which also contains means for setting the specific control voltage.

Ink mosaic recording devices utilizing recording nozzles which operate in accordance with the piezo-electric principle have utilized tubular drive elements of polarized ceramic, which contain the recording fluid and whose diameter is constricted when an electric voltage, corresponding to the polarization voltage, is connected thereto and expands when an electric voltage opposite to the polarity voltage is connected.

Circuit arrangements are known for the production of the voltages required in the controlling of recording nozzles, for example such as illustrated in U.S. Pat. No. 4,161,670 corresponding to German OS No. 25 48 691, in which the recording nozzles are expanded from a rest state by the connection of a voltage opposed to the polarity voltage, which expanded state is maintained for a predetermined length of time, and the droplet of ink subsequently ejected from the recording nozzle, which is brought from such an expanded state into a constricted state as a result of a change in polarity in the control voltage which produced the expanded state.

In such known circuit arrangement, there is provided for this purpose a voltage transformer circuit whose secondary-inductance, together with the capacitance of the recording nozzle, forms an oscillating circuit which is attenuated over an attenuating element. The level of the control voltage applied to the recording nozzles is determined by suitable means which is operative to limit the primary current in the voltage transformer circuit. This known method of driving the recording nozzles has the advantage that a very wide voltage range can be produced with relatively small changes in voltage in the ceramic tube of the recording nozzle. In addition, the control voltage for the recording nozzles can be individually set with respect to each recording nozzle, which is of particular advantage in ink mosaic recording devices in which the recording head contains a plurality of recording nozzles. In this case, a separate control circuit is provided for each recording nozzle.

However, the mode of operation of the recording nozzles required for normal, satisfactory operation, is dependent not only upon a circuit employing specific, individually adjustable control voltages, but also it is equally dependent upon the viscosity of the recording liquid. The viscosity of the ink normally used as the recording liquid is strongly temperature dependent, and changes even in the presence of slight variations in the environmental temperature. Thus, in ink jet recorders in which ink is supplied under static pressure to a nozzle and continuously ejected therefrom in the form of ink droplets and accelerated under the influence of an electrostatic field produced between the nozzle and the electrodes, utilizing a high voltage generator, it has already proven desirable to monitor the ink temperature by means of a temperature sensor and modifying the output voltage of the high voltage generator in dependence thereon. Such a type of an arrangement is illustrated, for example, in U.S. Pat. No. 3,914,772, corresponding to German AS No. 23 53 525.

This arrangement, however, is not suitable for ink mosaic recording devices comprising recording nozzles operating in accordance with the piezo-electric principle, particularly in devices wherein each individual nozzle of the recording head must be supplied with an individual control voltage, and in which the control circuit utilized to produce the individually adjustable control voltages are each associated with the individual recording nozzles.

BRIEF SUMMARY OF THE INVENTION

The present invention thus is directed to the production of a regulating circuit by means of which the voltage values for the individual recording nozzles which are set for a given temperature, can be altered in common in dependence upon fluctuations in temperature.

This objective is realized in the present invention by providing individual control circuits for the respective recording nozzles, each of which circuits is provided with adjustable means for setting the control voltage of the associated control circuit which, in the embodiment of the invention illustrated, comprises a voltage divider having an adjustable resistor for setting the specific control voltage. In accordance with the invention, there is provided a regulating circuit which includes regulating means and a temperature-dependent resistor for controlling the regulating means, whereby the latter supplies at its output a voltage which varies in accordance with the state of the environmental temperature-dependent resistor, which output voltage is supplied to each of the control circuits at said adjustable resistors.

In accordance with the further development of the invention, the temperature-dependent resistor comprises a thermistor and the regulating device comprises an operational amplifier, a following transistor and negative feedback means, with the operational amplifier being connected at its inverting input to a bias voltage and connected at its non-inverting input to a control voltage derived from the voltage divider circuit which varies in correspondence to temperature as a result of changes in the resistance value of said temperature-dependent resistor.

In a further development of the invention, the negative feed-back means between the output and input of the regulating device comprises an adjustable resistor which may be bridged by a diode.

A fundamental advantage of the invention is that the control circuits which operate to produce the control voltages required for the individual recording nozzles need be only slightly modified, and the principle of their operation, in particular, the means provided for individually setting the control voltages required for the individual recording nozzles can be retained. Further, changes in the control voltages resulting from changes in temperature influences all of the control circuits in common.

BRIEF DESCRIPTION OF THE DRAWING

Further details of the invention will be apparent from the figure of the drawing which illustrates an exemplary embodiment of the invention.

DETAILED DESCRIPTION OF THE INVENTION

Referring to the drawing, the reference numeral 1 designates respective recording nozzles which, for example, may total 12 in number, and to each of which is associated a control circuit, indicated generally by the reference numeral 2, by means of which each recording nozzle is supplied with its required control voltage. The construction of the control circuit 2 is known per se. The pulses applied to a pulse input 3 is supplied over a driver stage 4, which also serves to match the voltage conditions of the circuit arrangement, to an amplifier stage 5 constructed of integrated transistors connected in a Darlington circuit. The amplifier stage 5 is followed by the primary winding of a voltage transformer circuit 6 over which the recording nozzle is decoupled from the associated amplifier stage 5. The secondary inductance of the voltage transformer 6, together with the capacitance of the recording nozzle 1, forms an oscillating circuit which is damped on the secondary side by the series connected resistor 7 and diode 8. The control circuit 2 is supplied with operating voltage over the terminals 9 and 10 of a common voltage supply.

Operation of the circuit is as follows: A pulse arriving over the pulse input 3 renders the amplifier stage 5 conductive, whereby current flows through the primary winding of the voltage transformer circuit 6, thereby inducing a surge of voltage in the secondary winding. This initiates the oscillating circuit which comprises the secondary inductance of the voltage transformer circuit 6 and the capacitance of the recording nozzle 1. If the current is discontinued at the end of the pulse, a voltage is induced in the opposite direction. By suitable dimensioning of the attenuation means 7 and 8 and by matching the inductance of the secondary winding of the voltage transformer circuit 6 to the capacitance of the recording nozzle 1, it is possible to achieve an optimum voltage curve for the operation of the recording nozzle.

To enable adjustment of the voltages required for operation of the individual recording nozzles 1, the control circuit is provided with means for adjusting the base voltage of the amplifier stage 5. Resistors 11 and 12 and a limiter diode 13, form a network which is used for this purpose, the resistor 12 being in the form of potentiometer whereby the base voltage for the amplifier circuit 5 may be so adjusted that, in association with the emitter resistor 14, a current limitation takes place in the voltage transformer circuit 6, so that the individual voltage requirements of the respective recording nozzle may be readily matched. In a known control circuit, the adjustable resistors of the voltage divider are each connected to a constant voltage.

However, in accordance with the invention, the adjustable resistors 12 of the voltage dividers of all controlled circuits 2 are connected in common to the output 15 of a regulating circuit 16 which supplies an output voltage which is dependent upon the environmental temperature.

The regulating circuit 16 includes a temperature-dependent resistor 20, which preferably is a thermister, and includes a regulating device containing an operational amplifier 24 which is followed by a transistor 25. The non-inverting input of the operational amplifier 24 is connected to a voltage divider comprising resistors 17, 18 and 19, and also includes a temperature-dependent resistor 20. The inverting input of the operational amplifier 24 is connected to a second voltage divider and negative feedback is provided over an adjustable resistor 26 which is bridged by a diode 27.

Operation of the circuit illustrated is as follows:

The adjustable resistor 18, which can for example comprise a potentiometer, and which is disposed in the first voltage divider, is utilized to set the regulating means 24 and 25 in such manner that at room temperature a voltage, which is adequate to operate the recording nozzles, is supplied at the output 15 of the regulating circuit 16. The respective individual theoretical voltages for the individual recording nozzles 1 are set by adjustment of the resistors 12. Whenever a change occurs in the environmental temperature, a change also occurs in the resistance value of the temperature-dependent resistor 20, and thus in the output voltage of the regulating circuit 16. This output voltage, in turn, is supplied over the adjustable resistors 12 to the parallel connected inputs of the control circuits 2 and provides the control voltages for the individual recording nozzles 1, which control voltages are modified in proportion to the change in the output voltage at the output 15.

The negative feedback arm of the regulating device 24 and 25 includes the adjustable resistor 26 for setting the regulation gradient. Correction of gradient which might be required influencing the output voltage at room temperature, may be avoided by so adjusting the voltage connected to the non-inverting input of the operational amplifier 24, by means of the controllable resistor 18 of the first voltage divider, that the voltage at the inverting input of the operational amplifier 24 corresponds to the output voltage at the output 15 in the presence of normal room temperature.

In order to prevent the regulating voltage from dropping too steeply at high temperatures, the controllable resistor 26 disposed in the negative feedback arm may be bridged by a diode 27 which becomes conductive at high temperatures and thus with a low regulating voltage, and amplifies the negative feedback. This reduces the regulation gradient at high temperatures and insures that the regulation gradient which is set over the controllable resistor 26 becomes fully effective only at relatively low temperatures.

Although I have described my invention by reference to particular illustrative embodiments, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim as my invention:

1. A circuit arrangement for piezo-electric recording nozzles in ink mosaic recording devices to effect a temperature regulation of the control voltages therefor, comprising a control circuit for each recording nozzle, each control circuit including a voltage transformer circuit whose secondary inductance, together with the capacitance of the recording nozzle, forms an oscillating circuit, and a voltage divider having an adjustable resistor for setting the control voltage of the associated control circuit, a regulating circuit which is common to all control circuits and is connected to said adjustable resistor thereof, said regulating circuit including regulating means and a temperature-dependent resistor for controlling said regulating means whereby the latter emits at its output an output voltage which varies in accordance with the environmental temperature at said temperature-dependent resistor.

2. A circuit arrangement according to claim 1, wherein said temperature-dependent resistor comprises a thermister disposed in a voltage divider circuit, said regulating device comprising an operational amplifier, a following transistor and negative feedback means, said operational amplifier being connected at its inverting input to a bias voltage and being connected at its non-inverting input to a control voltage derived from said voltage divider circuit, which varies in correspondence to temperature as a result of changes in the resistance value of said temperature-dependent resistor.

3. A circuit arrangement according to claim 2, wherein the non-inverting input of said operational amplifier is connected to the arm of a potentiometer forming one of the resistors of said voltage divider, said potentiometer being so set that, at room temperature, the voltage at the output of said regulating circuit corresponds to the voltage connected to the inverting input of said operational amplifier.

4. A circuit arrangement according to claim 3, wherein said adjustable resistor of said negative feedback means is bridged by a diode.

5. A circuit arrangement according to claim 2, wherein said negative feedback means between the output and input of the regulating device comprises an adjustable resistor.

6. A circuit arrangement according to claim 5, wherein said adjustable resistor of said negative feedback means is bridged by a diode.

7. A circuit arrangement according to claim 6, wherein said negative feedback means between the output and input of the regulating device comprises an adjustable resistor.

* * * * *